US009963100B2

(12) United States Patent
Rao et al.

(10) Patent No.: US 9,963,100 B2
(45) Date of Patent: May 8, 2018

(54) AIRBAG CONTROLLER AND METHOD

(71) Applicant: Ford Global Technologies, LLC, Dearborn, MI (US)

(72) Inventors: Manoharprasad K. Rao, Novi, MI (US); Jialiang Le, Canton, MI (US); Robert William McCoy, Ann Arbor, MI (US); Hubert Szawarski, Waterford, MI (US)

(73) Assignee: FORD GLOBAL TECHNOLOGIES LLC, Dearborn, MI (US)

( * ) Notice: Subject to any disclaimer, the term of this patent is extended or adjusted under 35 U.S.C. 154(b) by 1 day.

(21) Appl. No.: 15/207,818

(22) Filed: Jul. 12, 2016

(65) Prior Publication Data
US 2018/0015897 A1 Jan. 18, 2018

(51) Int. Cl.
*B60R 21/231* (2011.01)
*B60R 21/0136* (2006.01)
(Continued)

(52) U.S. Cl.
CPC .... *B60R 21/23138* (2013.01); *B60R 21/0136* (2013.01); *B60R 21/01512* (2014.10);
(Continued)

(58) Field of Classification Search
CPC ............ B60R 21/015; B60R 21/01512; B60R 2021/0032; B60R 2021/23146;
(Continued)

(56) References Cited

U.S. PATENT DOCUMENTS 3,506,281 A * 4/1970 Berryman ........... B60R 21/2032
280/731
3,514,124 A * 5/1970 Richardson ........... B60R 21/205
280/728.1
(Continued)

FOREIGN PATENT DOCUMENTS

DE 29912578 U1 4/2000
DE 19904071 A1 * 8/2000 ........... B60R 21/207
(Continued)

OTHER PUBLICATIONS

EPO machine translation of DE102012013547 (original DE document published Jan. 24, 2013) (Year: 2013).*
(Continued)

*Primary Examiner* — Behrang Badii
*Assistant Examiner* — David A Testardi
(74) *Attorney, Agent, or Firm* — Frank A. MacKenzie; Bejin Bieneman PLC

(57) ABSTRACT

A controller for a vehicle includes a processor and a memory storing processor-executable instructions. The processor of the controller is programmed to receive a side-impact signal representing a collision to a side of the vehicle, receive an occupancy signal indicating that a first rear seat of the vehicle is occupied, and send an output control signal to deploy an airbag between a front seat adjacent the side of the vehicle and a second rear seat adjacent the side of the vehicle in response to the side-impact signal and the occupancy signal only when the second rear seat is unoccupied.

18 Claims, 8 Drawing Sheets

(51) Int. Cl.
  *B60R 21/015* (2006.01)
  *B60R 21/00* (2006.01)
  *B60R 21/01* (2006.01)
(52) U.S. Cl.
  CPC ............ *B60R 2021/0006* (2013.01); *B60R 2021/0032* (2013.01); *B60R 2021/01286* (2013.01); *B60R 2021/23153* (2013.01)
(58) Field of Classification Search
  CPC ........... B60R 2021/23153; B60R 2021/23138; B60R 21/23138
  See application file for complete search history.

(56) References Cited

U.S. PATENT DOCUMENTS

| | | | | |
|---|---|---|---|---|
| 3,779,577 | A * | 12/1973 | Wilfert | B60R 21/207 280/730.1 |
| 5,072,966 | A | 12/1991 | Nishitake et al. | |
| 5,324,071 | A * | 6/1994 | Gotomyo | B60N 2/02 280/730.1 |
| 5,415,429 | A * | 5/1995 | Fisher | B60R 21/16 280/728.1 |
| 5,975,565 | A * | 11/1999 | Cuevas | B60N 2/433 280/728.2 |
| 6,557,887 | B2 * | 5/2003 | Wohllebe | B60R 21/207 280/730.1 |
| 7,726,684 | B2 * | 6/2010 | Breed | B60R 21/205 280/729 |
| 7,920,722 | B2 | 4/2011 | Mita et al. | |
| 7,926,840 | B1 * | 4/2011 | Choi | B60R 21/214 280/730.1 |
| 8,353,529 | B2 | 1/2013 | Tomitaka et al. | |
| 8,430,424 | B1 * | 4/2013 | Rao | B60R 21/2334 280/730.2 |
| 8,702,122 | B2 | 4/2014 | Tomitaka et al. | |
| 9,308,883 | B1 * | 4/2016 | Schneider | B60R 21/231 |
| 2008/0125940 | A1 * | 5/2008 | Breed | B60R 21/013 701/45 |
| 2009/0001695 | A1 * | 1/2009 | Suzuki | B60R 21/231 280/730.2 |
| 2010/0090447 | A1 * | 4/2010 | Deng | B60R 21/214 280/730.1 |
| 2010/0133797 | A1 * | 6/2010 | Kim | B60R 21/214 280/743.2 |
| 2010/0140909 | A1 * | 6/2010 | Jang | B60R 21/231 280/743.1 |
| 2012/0049491 | A1 * | 3/2012 | Yoo | B60R 21/214 280/729 |
| 2012/0049492 | A1 * | 3/2012 | Choi | B60R 21/214 280/730.1 |
| 2012/0119475 | A1 * | 5/2012 | Choi | B60R 21/23138 280/729 |
| 2014/0042733 | A1 * | 2/2014 | Fukawatase | B60R 21/23138 280/730.2 |
| 2014/0097601 | A1 * | 4/2014 | Fukawatase | B60R 21/231 280/730.2 |
| 2015/0274113 | A1 * | 10/2015 | Nagasawa | B60R 21/207 280/730.2 |

FOREIGN PATENT DOCUMENTS

| | | | |
|---|---|---|---|
| DE | 102012013547 | A1 * | 1/2013 |
| FR | 2962705 | A1 | 1/2012 |
| JP | 07156736 | A * | 6/1995 |

OTHER PUBLICATIONS

Stolinski, Richard et al., "Side Impact Protection—Occupants in the Far-Side Seat", International Journal of Crashworthiness, vol. 3 No. 2, 1998, pp. 93-122 (Year: 1998).*

Stolinski, Richard et al., "Vehicle Far-Side Impact Crashes", Proceedings 16th International Technical Conference on the Enhanced Safety of Vehicles (ESV), Windsor, Ontario, Canada, May 31-Jun. 4, 1998, pp. 1819-1826 (Year: 1998).*

Sedgwick, "Supplies Develop Rear-Seat Airbags", http://www.autonews.com/article/20150215/OEM11/302169994/suppliers-develop-rear-seat-airbags, Apr. 30, 2016 (7 pages).

UKIPO Search Report for Application No. GB1711012.3 dated Dec. 1, 2017 (4 pages).

* cited by examiner

AIRBAG CONTROLLER AND METHOD

BACKGROUND

Vehicles, such as automobiles, may include airbags designed to inflate and be impacted by occupants of a rear seat during a front or side impact of the vehicle. For example, a side curtain airbag may deploy from above a door during a side collision, and the side curtain airbag may be impacted by an occupant in the rear seat adjacent to the side curtain airbag. For another example, an airbag may deploy rearward from a seatback of a front seat during a front impact, and an occupant in the rear seat behind the front seat may impact the airbag.

During a side impact to a side of the vehicle opposite an occupant sitting in a rear seat, the occupant may be urged laterally toward the impacted side by the force of the impact. While a seatbelt may mitigate some effects of a side impact to the occupant seated on the far side from the impact, not all states mandate wearing seat belts in the rear seats, and not all occupants choose to wear seatbelts.

DETAILED DESCRIPTION

Figure 1:
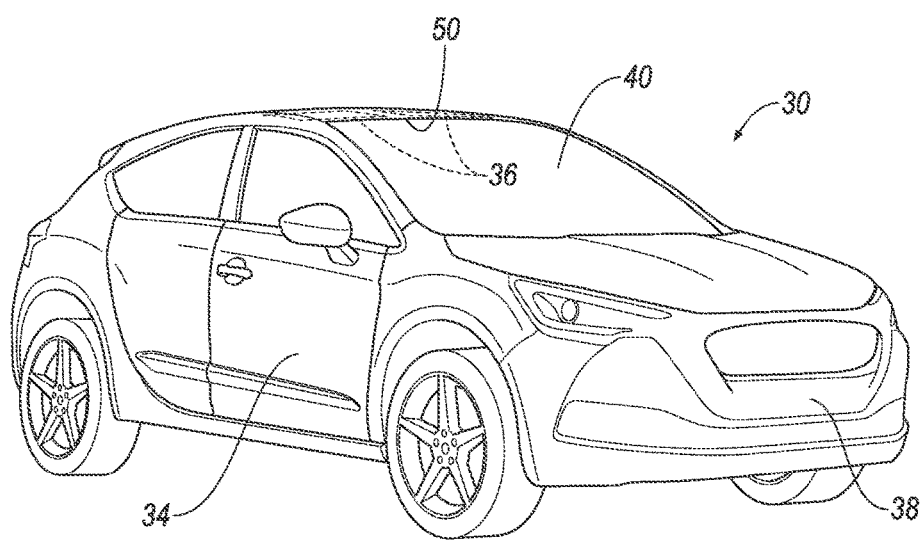
FIG. 1 is a perspective view of a vehicle.

With reference to the Figures, wherein like numerals indicate like parts throughout the several views, a controller 32 for a vehicle 30 includes a processor and a memory storing processor-executable instructions. The processor of the controller 32 is programmed to receive a side-impact signal representing a collision to a side 34 of the vehicle 30, receive an occupancy signal indicating that a first rear seat of the vehicle 30 is occupied, and send an output control signal to deploy an airbag 36 between a front seat 42 adjacent the side 34 of the vehicle 30 and a second rear seat adjacent the side 34 of the vehicle 30 in response to the side-impact signal and the occupancy signal only when the second rear seat is unoccupied. (The adjectives "first," "second," and "third" are used throughout this document as identifiers and are not intended to signify importance or order.)

Deploying the airbag 36 during a side impact may reduce the likelihood of injury to an occupant from moving toward the side 34 at which the impact occurred. Moreover, the same airbag 36 may be deployed during a front impact. Using the same airbag 36 for both impact scenarios is more efficient and cost-effective.

With reference to FIG. 1, the vehicle 30 may include a front 38, which is an end of the vehicle 30 facing in a forward direction of travel of the vehicle 30, and two sides 34, which are lateral from the direction of the forward travel of the vehicle 30.

With reference to FIGS. 2A-E, the vehicle 30 includes a passenger cabin 40 to house occupants, if any, of the vehicle 30. The passenger cabin 40 includes one or more front seats 42 disposed at a front of the passenger cabin 40 and one or more rear seats 44, 46, 48 disposed behind the front seats 42. The passenger cabin 40 may also include third-row seats (not shown) at a rear of the passenger cabin 40. A ceiling 50 may be disposed above the passenger cabin 40.

In FIGS. 2A-E, the front seats 42 are shown to be bucket seats, and the rear seats 44, 46, 48 are shown to be bench seats, but the seats may be other types. The row of rear seats may include a left rear seat 44, a middle rear seat 46, and a right rear seat 48. The terms "front seat" and "rear seat" refer to the position of a seat in a vehicle-forward direction relative to a different row of seating. In other words, if the vehicle 30 has three rows of seating, the second row in the vehicle-forward direction may be rear seats 44, 46, 48 relative to the first row and front seats 42 relative to the third row, and the third row may be rear seats 44, 46, 48 relative to the second row.

Each seat may include a seatback 52, a seat bottom (not numbered), and a headrest. The headrest may be supported by the seatback 52 and may be stationary or movable relative to the seat back. The seatback 52 may be supported by the seat bottom and may be stationary or movable relative to the seat bottom. The seatback 52, the seat bottom, and/or the headrest may be adjustable in multiple degrees of freedom. Specifically, the seatback 52, the seat bottom, and/or the headrest may themselves be adjustable, in other words, adjustable components within the seatback 52, the seat bottom, and/or the headrest, and/or may be adjustable relative to each other.

The airbags 36 may be configured to deploy between the front seats 42 and the rear seats 44, 46, 48. The airbags 36 may be disposed in the seatbacks 52 of the front seats 42, as shown in FIGS. 2A-E, or some or all of the airbags 36 may be disposed in the ceiling 50 above the front seats 42.

The airbag 36 may be formed of any suitable airbag material, for example, a woven polymer. For example, the airbag 36 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 2A:
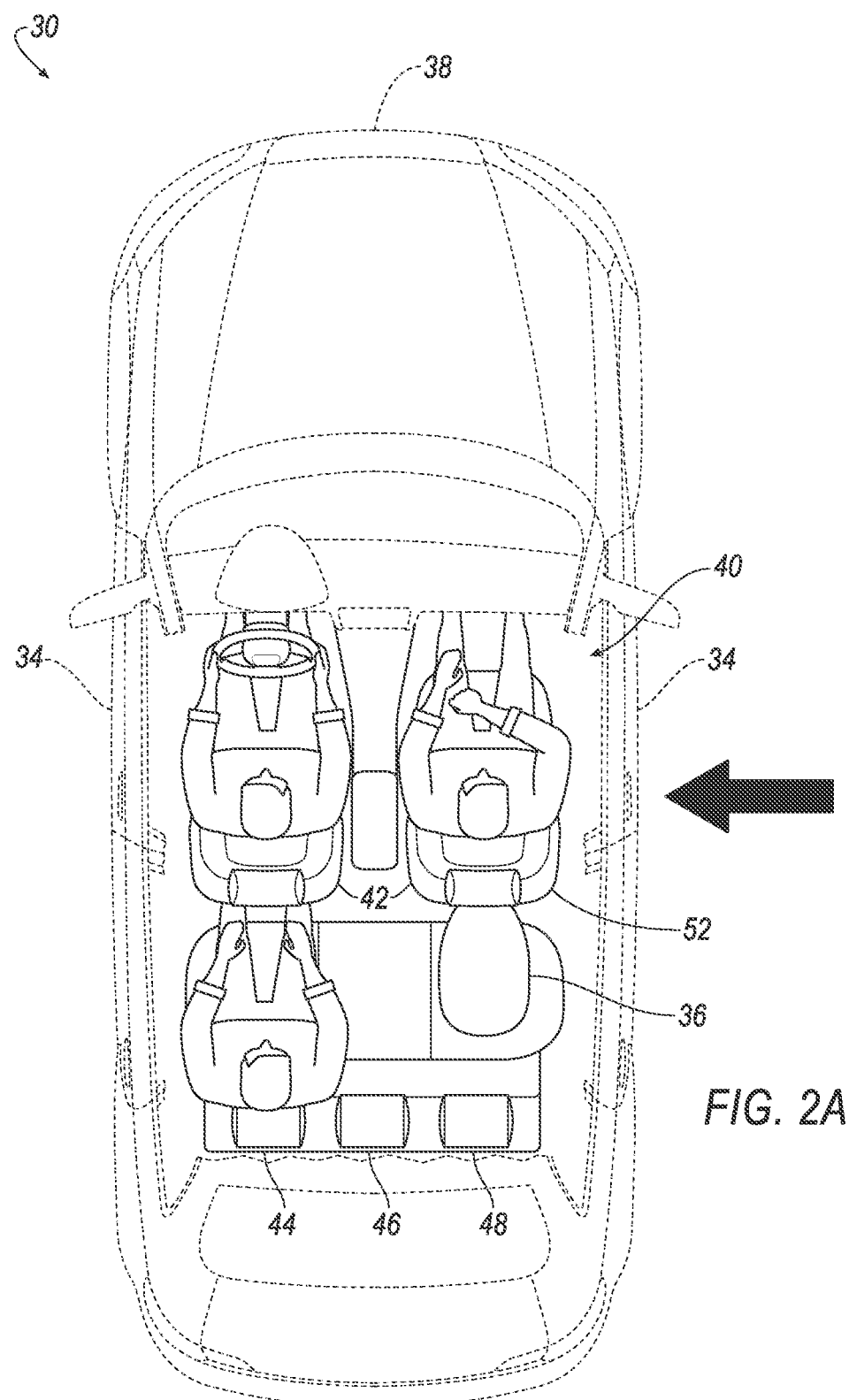
FIG. 2A is a top view of a passenger cabin of the vehicle during a side collision with a first rear seat occupied, a second rear seat unoccupied, and an airbag in a first deployed state.
Figure 2B:
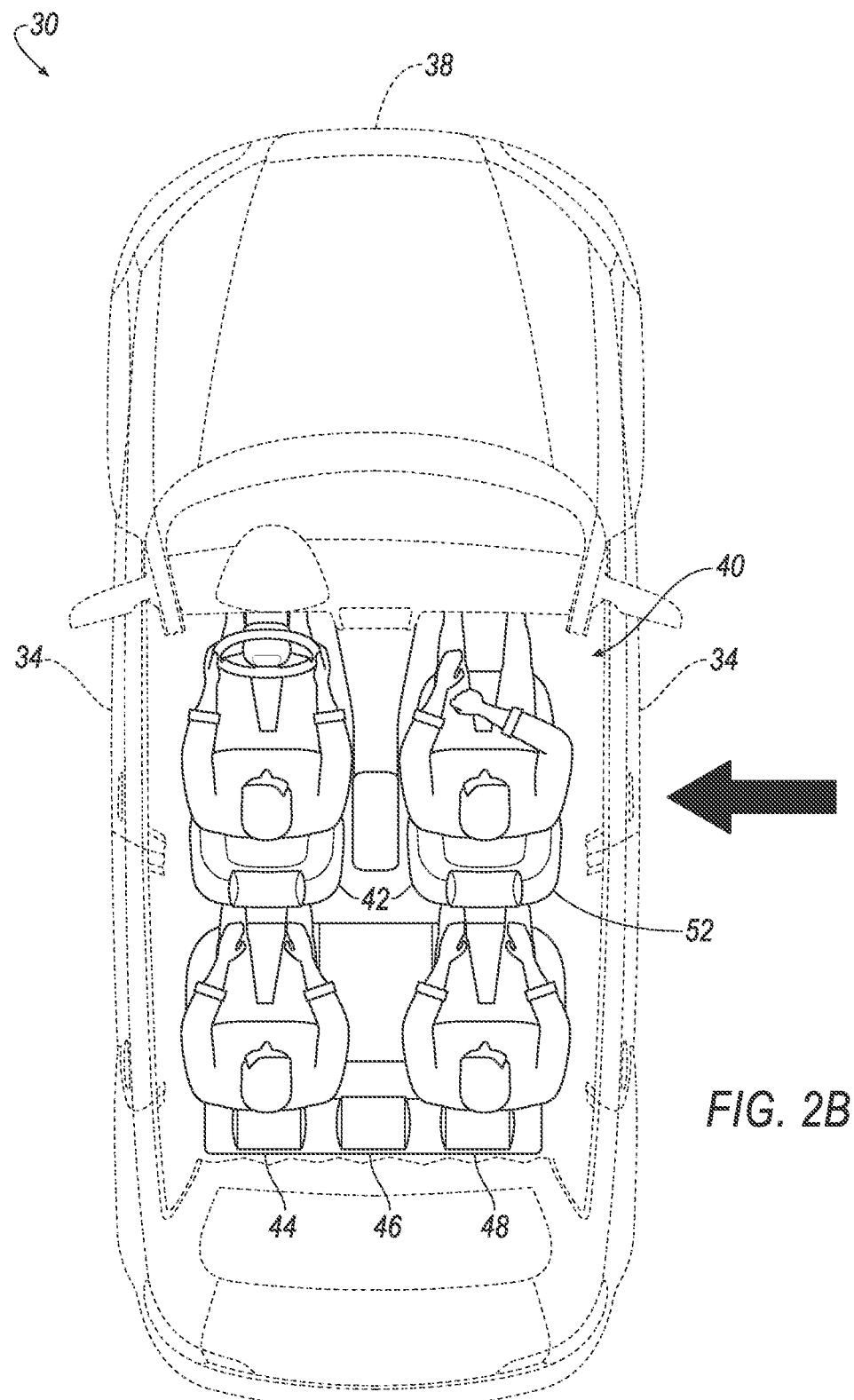
FIG. 2B is a top view of the passenger cabin of the vehicle during a side collision with the first rear seat occupied, the second rear seat occupied, and the airbag in an undeployed state.
Figure 2C:
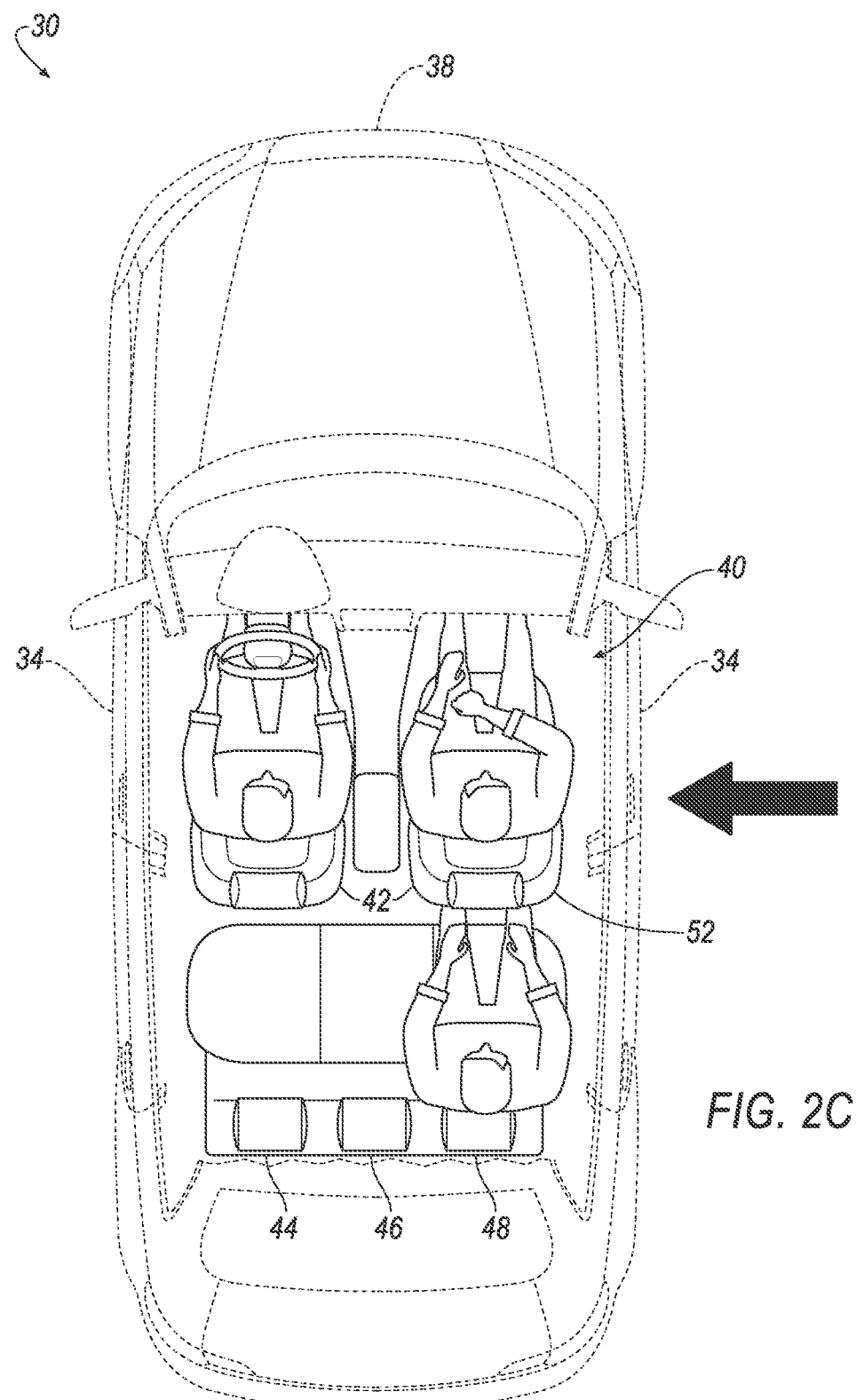
FIG. 2C is a top view of the passenger cabin of the vehicle during a side collision with the first rear seat unoccupied, the second rear seat occupied, and the airbag in the undeployed state.
Figure 2D:
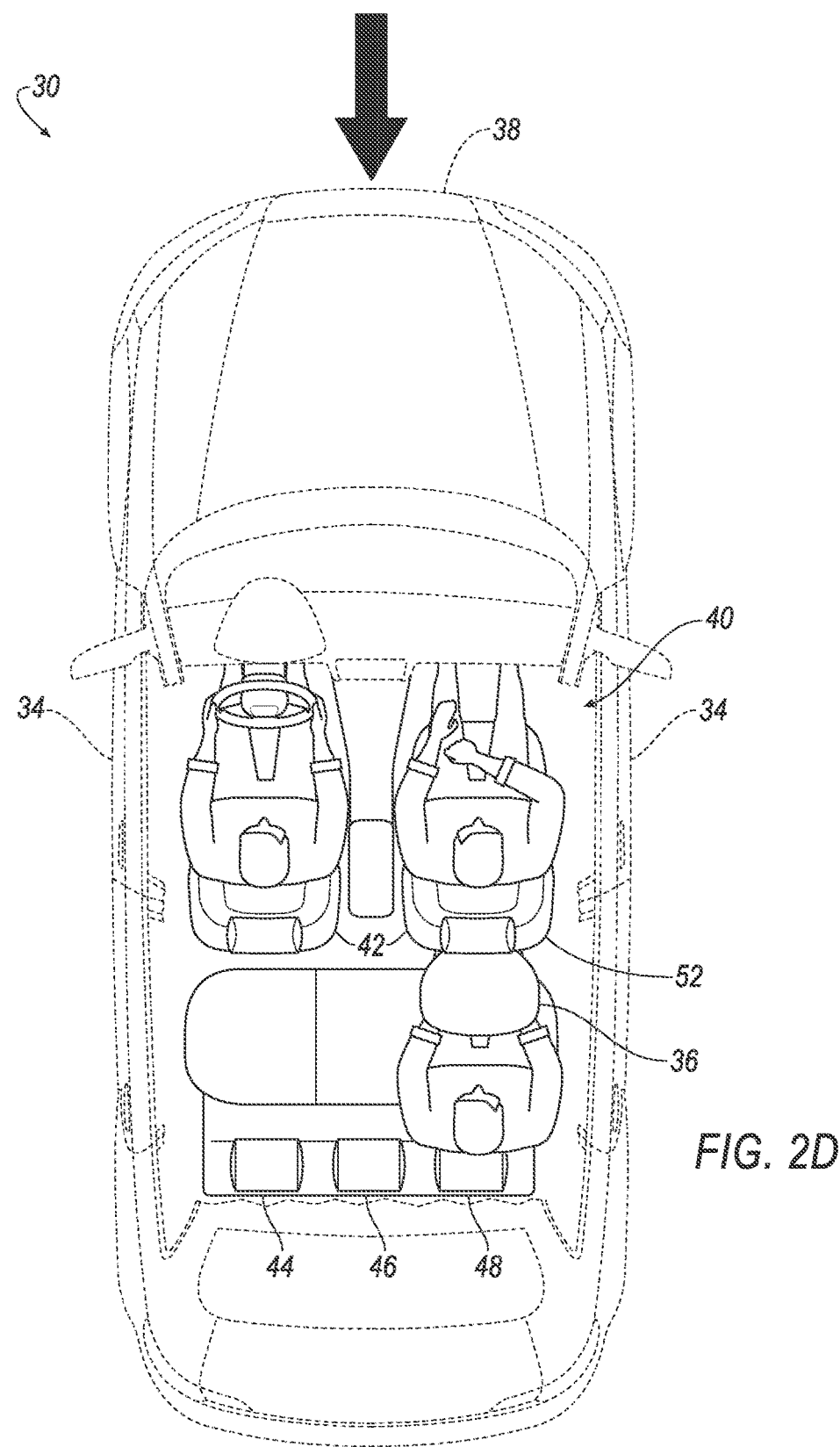
FIG. 2D is a top view of the passenger cabin of the vehicle during a front collision with the first rear seat unoccupied, the second rear seat occupied, and the airbag in a second deployed state.
Figure 2E:
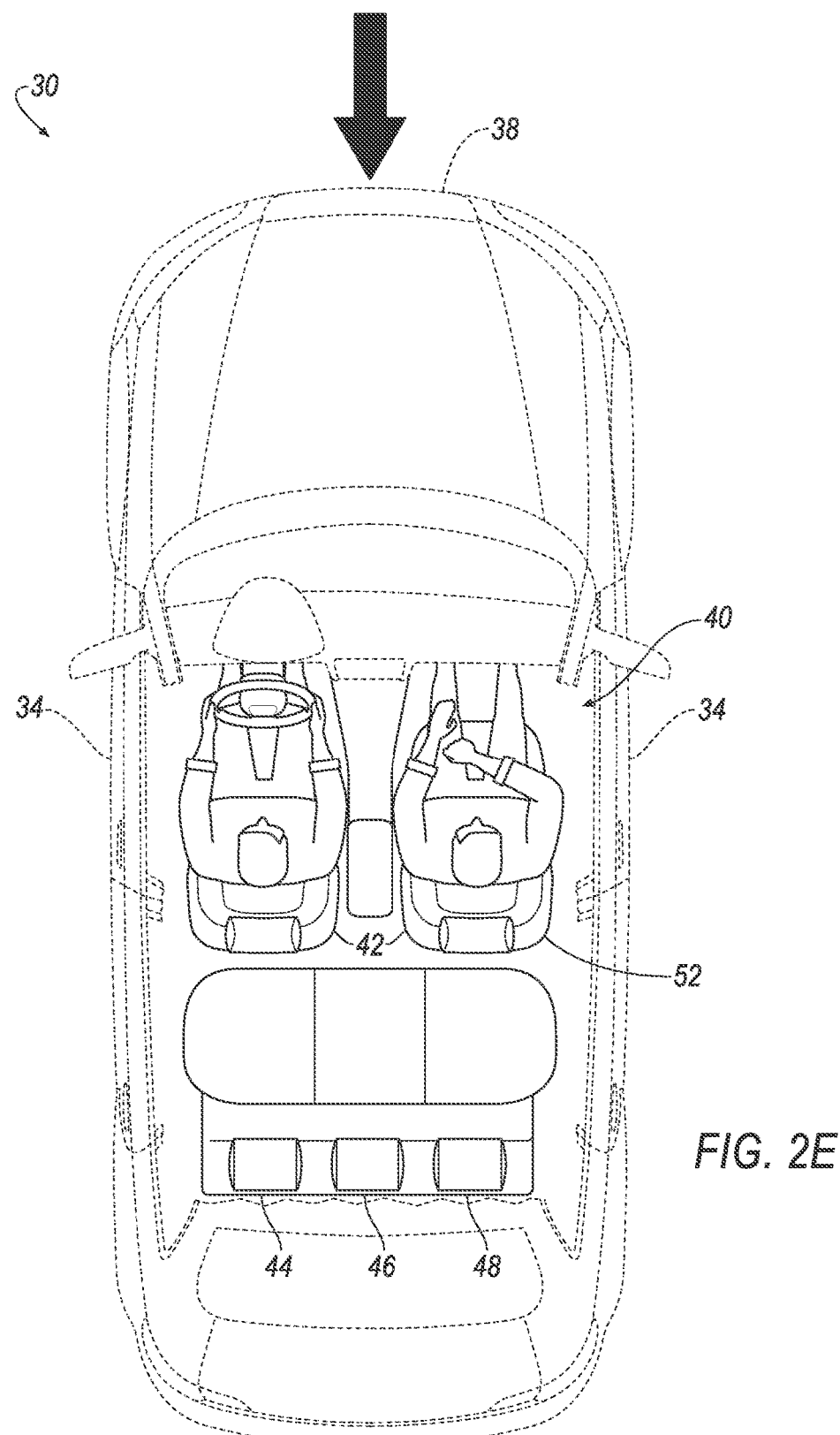
FIG. 2E is a top view of the passenger cabin of the vehicle during a front collision with the first rear seat unoccupied, the second rear seat unoccupied, and the airbag in the undeployed state.

The airbags 36 may have an undeployed state, shown in FIGS. 2B, 2C, and 2E; a first deployed state, shown in FIG. 2A; and a second deployed state, shown in FIG. 2D. In the undeployed state, the airbag 36 is folded and stored in the seatback 52 or the ceiling 50. In the first and second deployed states, the airbag 36 extends from the seatback 52 or the ceiling 50 and is disposed between the seatback 52 of the front seat 42 and the rear seat 44, 46, 48. A distance the airbag 36 extends away from the front seat 42 is longer for the airbag 36 in the first deployed state than the airbag 36 in the second deployed state. The difference between the first and second deployed states may be achieved by inflation patterns, tethers, vents, and/or release pins.

Figure 3:
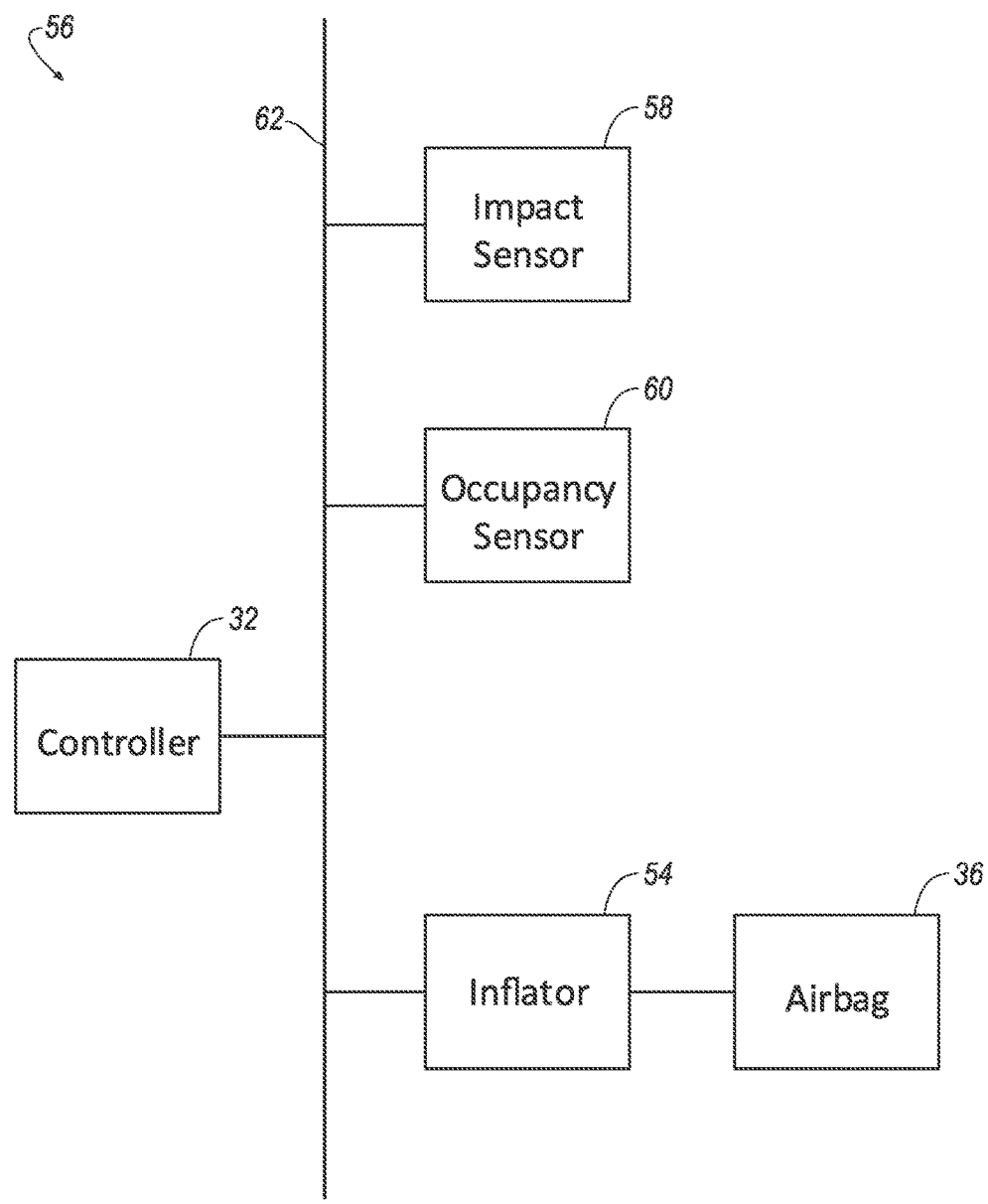
FIG. 3 is a block diagram of a control system of the vehicle.

With reference to FIG. 3, an inflator 54 may be connected to the airbag 36. In response to receiving a signal from, e.g., the controller 32, the inflator 54 may inflate the airbag 36 with an inflatable medium, such as a gas. The inflator 54 may be, for example, a pyrotechnic inflator that uses a chemical reaction to drive inflation medium to the airbag 36. The inflator 54 may be of any suitable type, for example, a cold-gas inflator.

A control system 56 may include the controller 32, the inflator 54, an impact sensor 58, and an occupancy sensor 60, all in communication through a communications network 62.

The controller 32 may be a microprocessor-based controller. The controller 32 may include a processor, memory, etc. The memory of the controller 32 may store instructions executable by the processor. The controller 32 may be in communication with the inflator 54, the impact sensor 58, and the occupancy sensor 60. The controller 32 may be in communication with the airbag 36 via the inflator 54.

The control system 56 may transmit signals through a communications network 62 such as a controller area network (CAN) bus, Ethernet, Local Interconnect Network (LIN), and/or by any other wired or wireless communications network.

The impact sensor 58 may be in communication with the controller 32. The impact sensor 58 is adapted to detect an impact to the vehicle 30. The impact sensor 58 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 58 may be located at numerous points in or on the vehicle 30. The impact sensor 58 may be adapted to detect a direction of impact to the vehicle 30, or multiple impact sensors 58 may detect impacts from different directions.

The occupancy sensor 60 is configured to detect occupancy of the seats. The occupancy sensor 60 may be visible-light or infrared cameras directed at the seats, weight sensors inside the seats, sensors detecting whether seat belts for the seats are buckled or unspooled, or other suitable sensors. The occupancy sensor 60 is in communication with the controller 32 via the communications network 62.

Figure 4:
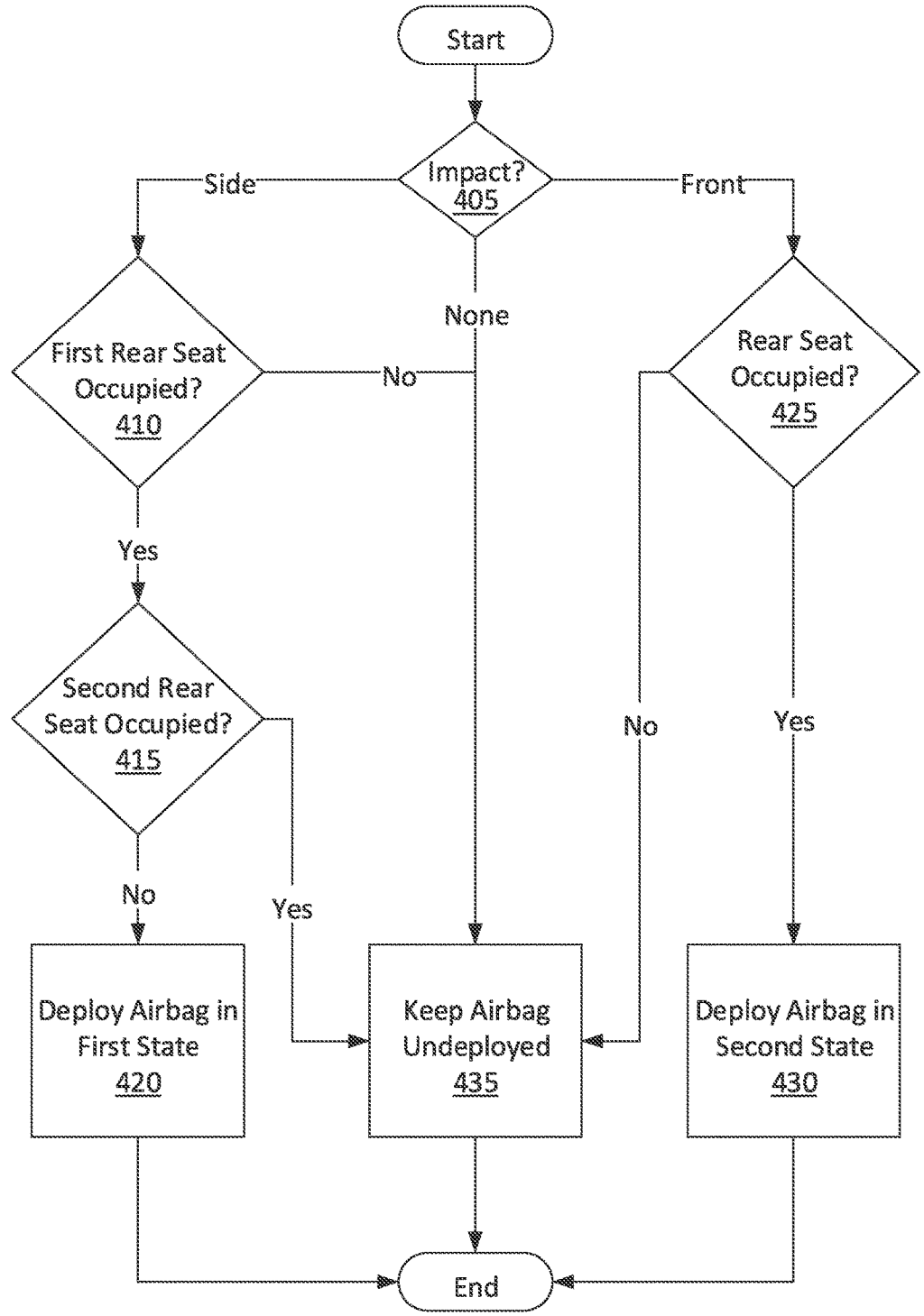
FIG. 4 is a process flow diagram for controlling the airbag.

FIG. 4 is a process flow diagram illustrating an exemplary process 400 for responding to an impact to the vehicle 30. The process 400 begins in a decision block 405. In the decision block 405, the controller 32 determines whether an impact has occurred and, if so, a direction of the impact. If the controller 32 receives a side-impact signal representing a collision to the side 34 of the vehicle 30 from the impact sensor 58, then the controller 32 determines that a side impact has occurred. If the controller 32 receives a front-impact signal representing a collision to the front 38 of the vehicle 30 from the impact sensor 58, then the controller 32 determines that a front impact has occurred. If the controller 32 receives no impact signals, then the controller 32 determines that an impact has not occurred, and, in a block 435, the controller 32 does not send any signal to deploy the airbag 36.

In the event of a side impact, next, in a decision block 410, the controller 32 determines whether the rear seat spaced away from the side 34 experiencing the impact is occupied. In describing blocks 410-420, the "first rear seat" refers to the rear seat spaced away from the side 34 experiencing the impact, and the "second rear seat" refers to the rear seat adjacent the side 34 experiencing the impact. If the impact is to the right side 34 of the vehicle 30, the first rear seat is the left or middle rear seat 44, 46, and the second rear seat is the right rear seat 48. The "third rear seat" refers to the middle rear seat 46. If the controller 32 receives an occupancy signal from the occupancy sensor 60 indicating that the first rear seat of the vehicle 30 is occupied, or if the controller 32 receives an occupancy signal indicating that the third rear seat between the first and second rear seats is occupied, then the process 400 moves to the decision block 415. If the controller 32 does not receive an occupancy signal with respect to the first or third rear seats, then, in the block 435, the controller 32 does not send any signal to deploy the airbag 36 between the front seat 42 and the second rear seat.

After the decision block 410, if the first or third rear seat is occupied, next, in a decision block 415, the controller 32 determines whether the second rear seat is occupied. If the controller 32 receives a second occupancy signal from the occupancy sensor 60 indicating that the second rear seat is occupied, then, in the block 435, the controller 32 does not send any signal to deploy the airbag 36 between the front seat 42 and the second rear seat. If the controller 32 determines that the second rear seat is unoccupied based on a lack of a signal indicating that the second rear seat is occupied from the occupancy sensor 60, then the process 400 proceeds to a block 420.

After the decision block 415, if the second rear seat is unoccupied, next, in the block 420, the controller 32 sends an output control signal to the inflator 54 to deploy the airbag 36 to the first deployed state between the front seat 42 adjacent the side 34 of the vehicle 30 and the second rear seat adjacent the side 34 of the vehicle 30. The controller 32 may also send an output control signal to, e.g., the release pins so that the airbag 36 inflates to the first deployed state. The effect of the blocks 405-420 is that the controller 32 sends the output control signal in response to the side-impact signal and the occupancy signal for the first or third rear seat only when the second rear seat is unoccupied.

If the controller 32 determines in the decision block 405 that a front impact has occurred, next, in a decision block 425, the controller 32 determines whether the rear seat is occupied. This step may occur for each of the rear seats 44, 46, 48 adjacent the sides 34 of the vehicle 30. If the controller 32 receives an occupancy signal indicating that the rear seat is occupied, the process 400 proceeds to a block 430. If the controller 32 determines that the rear seat is unoccupied based on a lack of a signal indicating that the rear seat is occupied, the controller 32 does not send any signal to deploy the airbag 36 between the front seat 42 and the rear seat.

After the decision block 425, if the rear seat is occupied, next, in the block 430, the controller 32 sends an output control signal to deploy the airbag 36 to the second deployed state between the front seat 42 and the rear seat. This step may occur for each of the rear seats 44, 46, 48. The controller 32 may also send an output control signal to, e.g., the release pins so that the airbag 36 inflates to the second deployed state. The effect of the blocks 405 and 425-430 is that the controller 32 sends the output control signal in response to the front-impact signal and the occupancy signal.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:
receiving a side-impact signal representing a collision to a side of a vehicle;
receiving an occupancy signal indicating that a first rear seat of the vehicle is occupied;
sending an output control signal to deploy an airbag between a front seat adjacent the side of the vehicle and a second rear seat adjacent the side of the vehicle in response to the side-impact signal and the occupancy signal only upon determining the second rear seat is unoccupied;
receiving an occupancy signal representing occupancy of a third rear seat between the first and second rear seats; and
sending an output control signal to deploy the airbag in response to the side-impact signal only upon determining the third rear seat is occupied and the second rear seat is unoccupied.

2. The method of claim 1, further comprising determining that the second rear seat is unoccupied based on a lack of a signal indicating that the second rear seat is occupied.

3. The method of claim 1, wherein the airbag is disposed in a seatback of the front seat.

4. The method of claim 1, wherein the airbag is disposed in a ceiling above the front seat.

5. A controller comprising a processor and a memory storing processor-executable instructions, wherein the processor is programmed to:
receive a side-impact signal representing a collision to a side of the vehicle;
receive an occupancy signal indicating that a first rear seat of the vehicle is occupied;
send an output control signal to deploy an airbag between a front seat adjacent the side of the vehicle and a second rear seat adjacent the side of the vehicle in response to the side-impact signal and the occupancy signal only when the second rear seat is unoccupied;
receive an occupancy signal representing occupancy of a third rear seat between the first and second rear seats, and
send an output control signal to deploy the airbag in response to the side-impact signal only when the third rear seat is occupied and the second rear seat is unoccupied.

6. The controller of claim 5, wherein the processor is further programmed to determine that the second rear seat is unoccupied based on a lack of a signal indicating that the second rear seat is occupied.

7. The controller of claim 5, wherein the processor is further programmed to receive a front-impact signal representing a collision to a front of the vehicle; receive a second occupancy signal indicating that the second rear seat is occupied; and send an output control signal to deploy the airbag in response to the front-impact signal and the second occupancy signal.

8. The controller of claim 7, wherein the processor is further programmed to send an output control signal to deploy the airbag to a first deployed state in response to the side-impact signal and the occupancy signal only when the second rear seat is unoccupied; and send an output control signal to deploy the airbag to a second deployed state in response to the front-impact signal and the second occupancy signal.

9. The controller of claim 8, wherein a distance the airbag extends away from the front seat is longer for the airbag in the first deployed state than the airbag in the second deployed state.

10. The controller of claim 5, wherein the airbag is disposed in a seatback of the front seat.

11. The controller of claim 5, wherein the airbag is disposed in a ceiling above the front seat.

12. A vehicle comprising:
a side;
a first rear seat;
a second rear seat adjacent the side;
a front seat adjacent the side;
a third rear seat between the first and second rear seats;
an airbag configured to deploy between the front seat and the second rear seat; and
a controller including a processor and a memory storing processor-executable instructions in communication with the airbag;
wherein the processor is programmed to
receive a side-impact signal representing a collision to the side;
receive an occupancy signal indicating that the first rear seat is occupied;
send an output control signal to deploy the airbag in response to the side-impact signal and the occupancy signal only when the second rear seat is unoccupied;
receive an occupancy signal representing occupancy of the third rear seat; and
send an output control signal to deploy the airbag in response to the side-impact signal only when the third rear seat is occupied and the second rear seat is unoccupied.

13. The vehicle of claim 12, wherein the processor is programmed to determine that the second rear seat is unoccupied based on a lack of a signal indicating that the second rear seat is occupied.

14. The vehicle of claim 12, further comprising a front of the vehicle; wherein the processor is programmed to receive a front-impact signal representing a collision to the front, receive a second occupancy signal indicating that the second rear seat is occupied, and send an output control signal to deploy the airbag in response to the front-impact signal and the second occupancy signal.

15. The vehicle of claim 14, wherein the airbag has a first deployed state and a second deployed state; and the processor is programmed to send an output control signal to deploy the airbag to the first deployed state in response to the side-impact signal and the occupancy signal only when the second rear seat is unoccupied, and send an output control signal to deploy the airbag to the second deployed state in response to the front-impact signal and the second occupancy signal.

16. The vehicle of claim 15, wherein a distance the airbag extends away from the front seat is longer for the airbag in the first deployed state than the airbag in the second deployed state.

17. The vehicle of claim 12, wherein the front seat includes a seatback, and the airbag is disposed in the seatback.

18. The vehicle of claim 12, further comprising a ceiling, wherein the airbag is disposed in the ceiling above the front seat.

\* \* \* \* \*